(12) United States Patent
Hirose et al.

(10) Patent No.: US 6,326,129 B1
(45) Date of Patent: Dec. 4, 2001

(54) PROCESS FOR MANUFACTURING AN ACTIVE ELEMENT ARRAY SUBSTRATE

(75) Inventors: Takashi Hirose; Junji Boshita; Norihisa Asano, all of Ishikawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/526,570

(22) Filed: Mar. 16, 2000

(30) Foreign Application Priority Data

Mar. 16, 1999 (JP) .................................................. 11-070169

(51) Int. Cl.[7] ............................ G02F 1/1343; G02F 1/133
(52) U.S. Cl. .......................... 430/312; 430/318; 430/319; 438/30
(58) Field of Search ..................... 430/312, 318, 430/319, 321; 438/30

(56) References Cited

U.S. PATENT DOCUMENTS 6,022,753 * 2/2000 Park et al. ............................... 438/30
6,184,069 * 2/2001 Wu ......................................... 438/155

FOREIGN PATENT DOCUMENTS

| 60-112089 | 6/1985 | (JP) . |
| 9-160068 A * | 6/1997 | (JP) . |
| 10-163500 | 6/1998 | (JP) . |
| 11-2818 | 1/1999 | (JP) . |

* cited by examiner

Primary Examiner—John A. McPherson
(74) Attorney, Agent, or Firm—Ratner & Prestia

(57) ABSTRACT

A process for manufacturing an active element array substrate, such as for a display panel in a liquid crystal display device. The process comprises exposing photosensitive resin to an irradiation light from the rear face of the substrate and to another irradiation light applied from the front face of the substrate. The irradiation light from the front face of the substrate exposes a region encompassing substantially all of the pixel electrode extending from over a portion of the drain electrode to near the source and gate electrodes. This enables selective exposure of the photosensitive resin to the light from the front face even if scratches or dust exist on the rear face of the substrate during exposure to the light from the rear face, thus increasing the manufacturing yield of such active element array substrates.

15 Claims, 5 Drawing Sheets

PROCESS FOR MANUFACTURING AN ACTIVE ELEMENT ARRAY SUBSTRATE

FIELD OF THE INVENTION

The present invention relates to the field of processes for manufacturing active element array substrates for driving liquid crystals in display panels of liquid crystal display devices such as are used in information processing.

BACKGROUND OF THE INVENTION

Liquid crystal display panels, extensively used in information equipment such as office automation (OA) equipment and televisions, achieve high quality images by the use of active element arrays in which more than one active element for driving the liquid crystal, such as thin film transistors (TFTs), are aligned on a substrate.

In liquid crystal display panels using active element array substrates, it is important to secure a large aperture ratio for the pixels in order to achieve a bright display and reduce power consumption. An effective way of increasing the aperture ratio is to dispose the pixel electrodes on the uppermost layer of an array substrate.

This process for manufacturing an active element array substrate is disclosed in the Japanese Laid-open Patent No. S60-112089.

FIGS. 4 and 5 are a sectional view and plan view, respectively, illustrating the conventional process for manufacturing an active element array substrate. FIG. 4 is a sectional view taken along Line 4—4 in FIG. 5.

First, a gate electrode 2 that also functions as wiring for supplying scanning voltage is formed onto a glass substrate 1, and then a gate insulation film 3 is formed over the entire face. Next, an amorphous Si (a-Si) island 4 is formed to create a TFT channel and a source-drain contact. A source electrode is connected to the source contact portion of the a-Si island 4 by source electrode wiring 5 that also functions as wiring for supplying a signal voltage to the source electrode. Drain electrode 6 connects to the drain contact of the a-Si island 4. After forming a transparent conductive layer 7 made of indium tin oxide (ITO) over the entire face, a negative photosensitive resin 8 is coated.

Next, the photosensitive resin 8 is exposed in a self-aligned manner by applying a rear irradiation light 12 from the reverse side of the substrate 1 using the gate electrode 2, source electrode wiring 5, and drain electrode 6 as a mask. The photosensitive resin 8 on the drain electrode 6 is then exposed (FIG. 4) by selective exposure of a surface irradiation light 11 from the surface of the substrate 1 using a photo mask substrate 10 with a light-blocking layer 9. The light-blocking layer 9 is patterned to have an opening at an area of the drain electrode 6. This enables the photosensitive resin on the drain electrode to be exposed, which does not occur during the exposure step from the reverse side alone.

Unexposed portions of the photosensitive resin 8 are removed by developing, thus creating a pixel electrode mask made of exposed portions of the photosensitive resin 8. In other words, those portions of the photosensitive resin 8 which are not exposed to illumination from the surface or reverse side are removed by developing. This pixel electrode mask is now used as an etching mask for etching the transparent conductive layer 7 to form a pixel electrode 7a. The pixel electrode formed in this way extends to the edge of the gate electrode 2 and source electrode wiring 5, and is connected to the drain electrode 6. Lastly, exposed portions of the photosensitive resin 8 are removed to complete an active element array substrate (FIG. 5).

As described above, the pixel electrode 7a can be increased in area by extending it to the edge of the gate electrode 2 and source electrode wiring 5. This is done by forming an exposed portion in the photosensitive resin 8 with the rear face irradiation light 12, which is self-aligned using the wiring as a mask, and the surface irradiation light 11, which selectively exposes drain electrode 6. In addition, this prevents short-circuiting of the gate electrode 2 and source electrode wiring 5. Accordingly, an active element array substrate with a large aperture ratio may be achieved by forming the pixel electrode on the uppermost layer of the substrate.

However, the above conventional method for manufacturing an active element array substrate may result in reduced yields due to scratches or dust on the rear face of the substrate.

The influence of scratches or dust on the rear face of the substrate is described next with reference to FIGS. 6 and 7.

FIGS. 6 and 7 are a sectional view and a plan view, respectively, illustrating the influence of dust on the rear face of the substrate in the conventional method for manufacturing an active element array substrate. FIG. 6 is a sectional view taken along 6—6 in FIG. 7. As shown in FIGS. 6 and 7, dust 13 adhering to the rear face of the substrate 1 during exposure of the photosensitive resin 8 using the rear face irradiation light 12 creates a portion which is not exposed either from the surface or the rear face. This generates a resist corresponding to dust 13 and thus creates a defect 7b on pixel electrode 7a. Other configurations are the same as the prior art shown in FIGS. 4 and 5, and the same numbers are given to the same components.

If there is dust 13 on the rear face of the substrate 1, the rear face irradiation light 12 exposes the photosensitive resin 8 using wiring and also the dust 13 as a mask (FIG. 6).

If the transparent conductive layer is etched using the exposed portion of the photosensitive resin 8 as a mask, pixel electrode 7a corresponding to dust 13 is also etched, generating a defect 7b (FIG. 7).

The rear face of the substrate is often scratched or collects dust or stains while it is being held during transportation. Scratches and stains may also cause defect 7b as a result of insufficient exposure to the light applied to photosensitive resin 8. Defect 7b creates a non-driven part of liquid crystal in a pixel, reducing the yield of the active element array substrate.

The present invention aims to eliminate the reduced yield caused by scratches and dust on the rear face of a substrate, and enables the manufacture of an active element array substrate with a large aperture ratio at good yields.

SUMMARY OF THE INVENTION

The present invention comprises a process for manufacturing an active element array substrate in which more than one pixel electrode for driving liquid crystal and more than one active element connected to the pixel electrode through a connecting electrode are aligned in matrix. The process comprises the steps of forming and aligning a plurality of active elements and more than one wiring element connected to each active element on the front surface of a transparent substrate; forming a transparent conductive layer over the entire surface of the transparent substrate; forming a negative photosensitive resin layer over the entire face of the transparent conductive layer; exposing a photosensitive resin layer to light applied from the rear face of the transparent substrate using the wiring and the connecting electrode as a self-aligned mask; selectively exposing a portion of the photosensitive resin layer corresponding to almost the entire region of the pixel electrode, including the connecting electrodes, to the light from the surface of the transparent substrate; developing the exposed photosensitive resin layer to form a mask; and forming pixel electrodes by processing the transparent conductive layer using this mask.

Thus, essentially, the invention comprises a process for forming a pixel electrode for a liquid crystal element on a substrate, the liquid crystal element also comprising an active element and wiring associated therewith. The process comprises first forming a continuous transparent electrode layer over the substrate, active element, and associated wiring. Next, a continuous photosensitive layer is formed over the transparent electrode layer. The photosensitive layer has a back side and an opposite front side. Then, the photosensitive layer is exposed to radiation from the back side and from the front side. The exposure from the front side includes exposing substantially all of the photosensitive layer designated to become the pixel electrode that is not masked during the exposure from the back side by the active element and associated wiring.

The present invention thus enables exposure of the photosensitive resin layer at least from the surface even if scratches or dust on the rear face of the substrate prevent exposure from the rear face. Accordingly, the light may be sufficiently applied to the photosensitive resin by selective exposure from the surface, preventing the occurrence of defective pixel electrodes due to scratches or dust on the rear face of the substrate. The present invention thus achieves a process for manufacturing an active element array substrate at good yields. The use of TFTs as the active elements provide a good picture quality with less cross talk in a liquid crystal display device.

In the step of forming the transparent conductive layer, the use of ITO as the transparent conductive layer enables achievement of pixel electrodes with stable optical and electrical characteristics and good processing accuracy.

DESCRIPTION OF THE PREFERRED EMBODIMENT

A preferred embodiment of the present invention is described with reference to FIGS. 1, 2A to 2D, 3A, and 3B.

Figure 1:
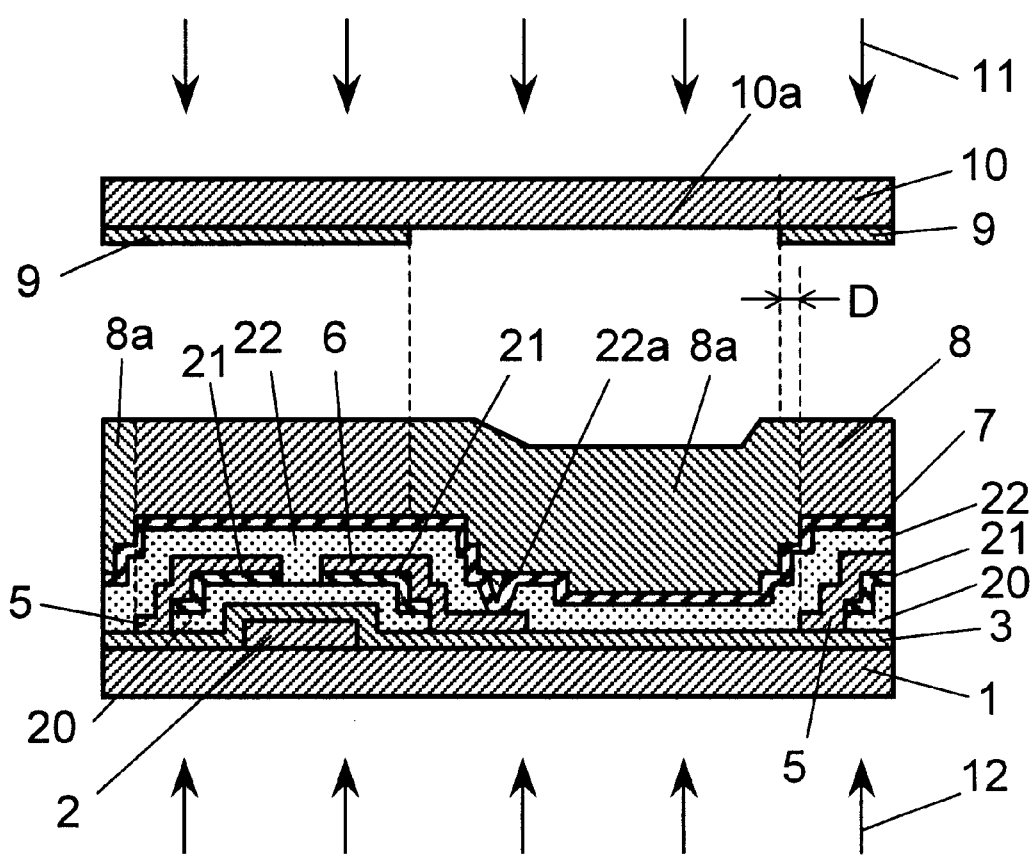
FIG. 1 is a structural sectional view illustrating a process in an intermediate step in an exemplary process for manufacturing an active element array substrate in a preferred embodiment of the present invention.
Figure 2A:
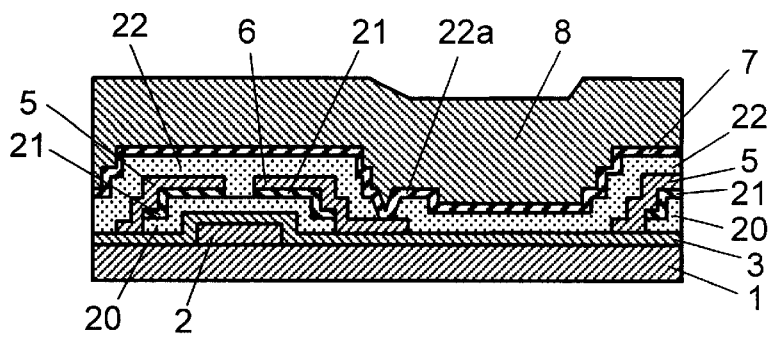
FIGS. 2A to 2D are structural sectional views illustrating each step of an exemplary process for manufacturing an active element array substrate in a preferred embodiment of the present invention.
Figure 2B:
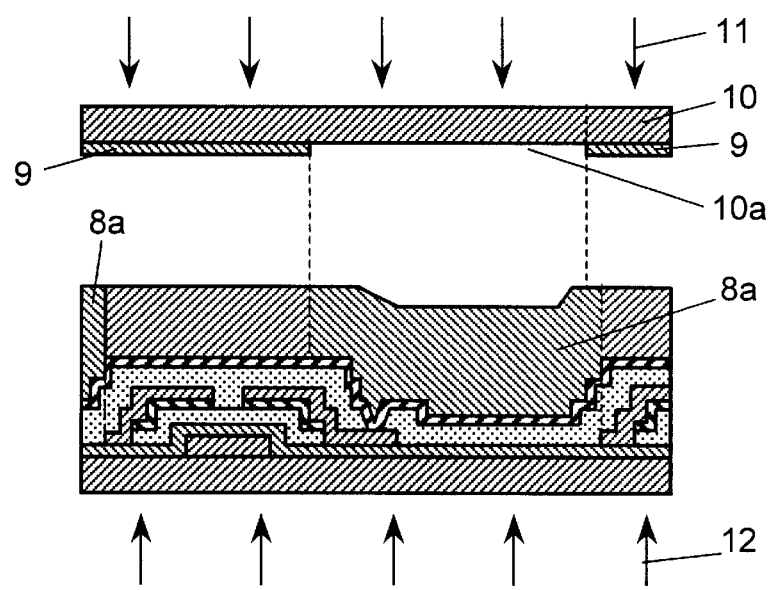

FIG. 1 is a structural sectional view illustrating a process in an intermediate step of an exemplary process for manufacturing an exemplary active element array substrate in a preferred embodiment of the present invention. FIGS. 2A to 2D are sectional views of the active element array after subsequent steps in the process for manufacturing the active element array substrate according to a preferred embodiment. FIGS. 3A and 3B are fragmentary plan views of the structure at an intermediate point in the process. FIGS. 2A to 2D are sectional views taken along Line 1—1 in FIG. 3B.

Figure 2C:
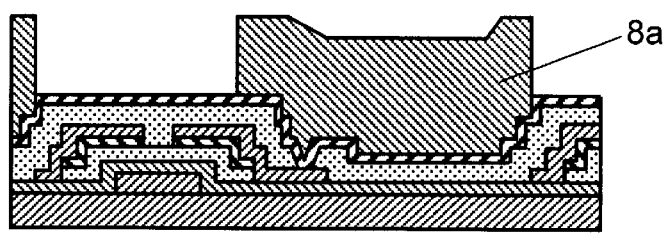
Figure 2D:
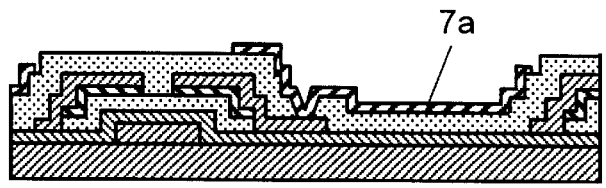
Figure 3A:
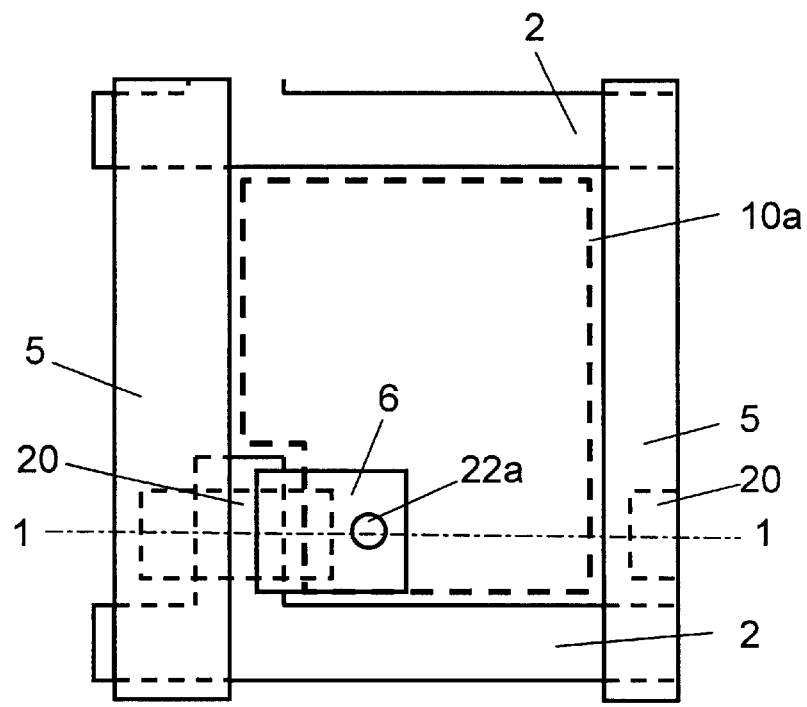
FIGS. 3A and 3B are fragmentary plan views illustrating each step of the exemplary process for manufacturing an active element array substrate in a preferred embodiment of the present invention.
Figure 3B:
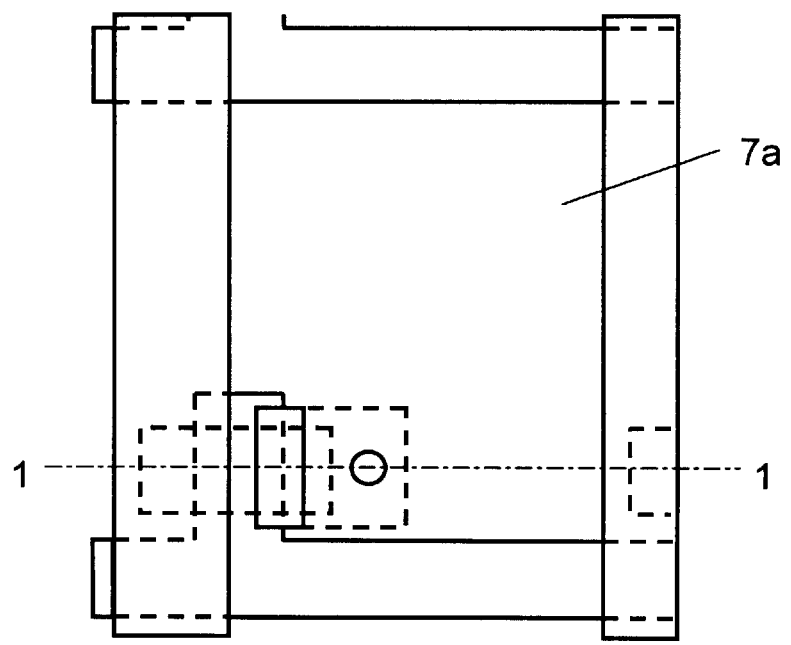
Figure 4:
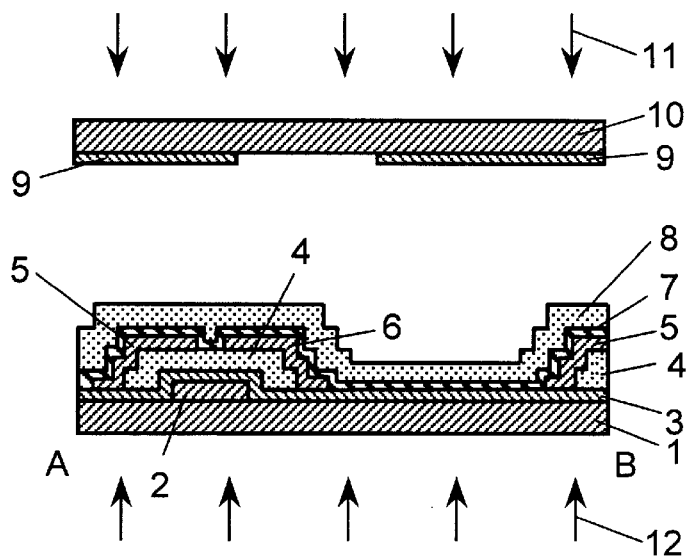
FIG. 4 is a structural sectional view of a conventional method for manufacturing an active element array substrate.
Figure 5:
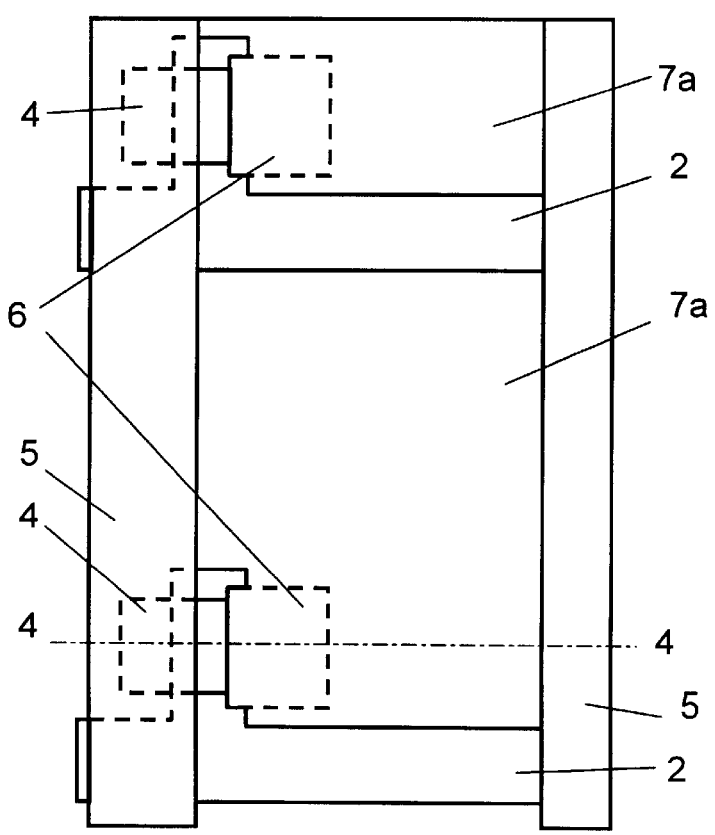
FIG. 5 is a fragmentary plan view of a conventional method for manufacturing an active element array substrate.
Figure 6:
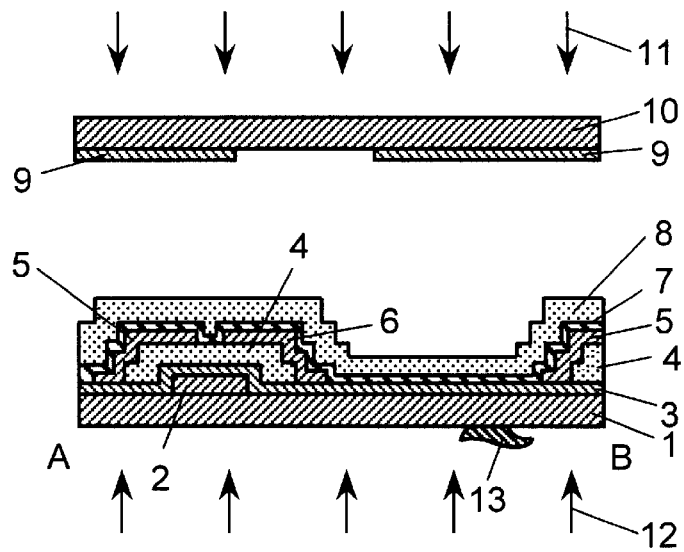
FIG. 6 is a structural sectional view illustrating a problem in the conventional method for manufacturing an active element array substrate.
Figure 7:
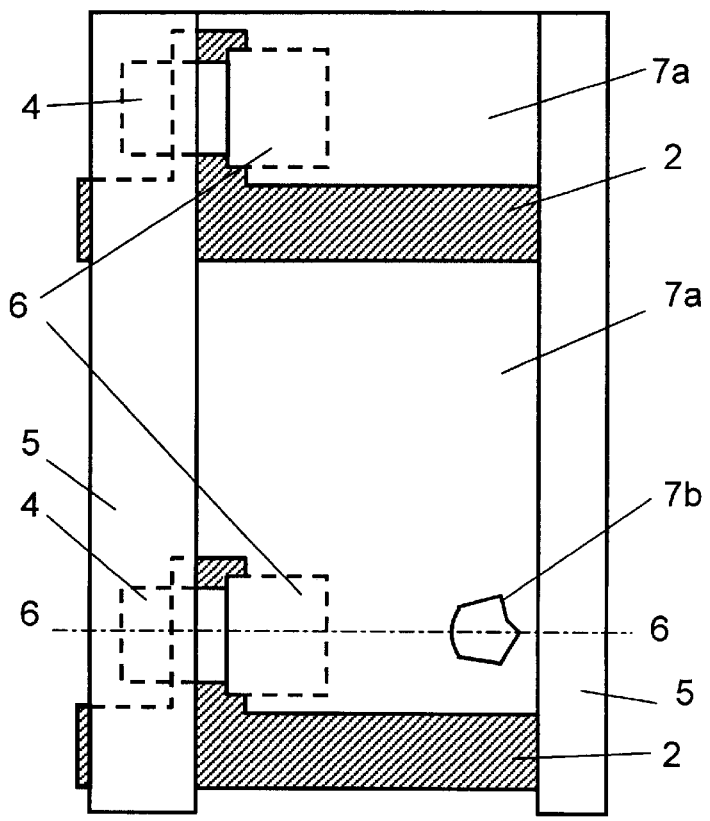
FIG. 7 is a fragmentary plan view illustrating a problem in the conventional method for manufacturing an active element array substrate.

Indicated in FIGS. 1 to 3B are a TFT channel layer 20, contact layer 21, insulating protective film 22, and a contact hole 22a opened on the protective film 22 for connecting a transparent conductive layer 7 to a drain electrode 6. Other configurations are the same as those in an active element array substrate of the prior art as shown in FIGS. 4 and 5, and thus their explanation is omitted here by giving the same reference numerals.

First, a gate electrode 2 that also functions as gate wiring is formed on a glass transparent substrate 1, for example, by depositing a AlZr alloy (Zr=about 1 atomic percent) in a layer about 350 nm thick, and etching it to a gate pattern. Three layers—for example, SiNx which becomes a gate insulation film 3, a-Si which becomes the channel layer 20, and low-resistance a-Si which becomes the contact layer 21—are formed, preferably using a plasma assisted chemical vapor deposition (p-CVD) method, and then the a-Si and low-resistance a-Si are etched into an island shape. Next, a layer of Ti is formed, preferably approximately 200 nm thick, and etched into the shape of source electrode wiring 5 and drain electrode 6. The low-resistance a-Si between the source electrode wiring 5 and drain electrode 6 is also removed. The low-resistance a-Si remaining underneath the source electrode wiring 5 and drain electrode 6 becomes contact layer 21 for reducing the contact resistance. The SiNx layer is deposited on the entire face, preferably using the p-CVD method, to form the protective film 22.

A part of protective film 22 on drain electrode 6 is removed to form a contact hole 22a. A transparent conductive layer 7 made of ITO with thickness of about 100 nm is formed on the entire face, and a negative photosensitive resin 8 is applied and cured. FIG. 2A shows a sectional view of an array substrate after the above steps. Then, the photosensitive resin 8 is exposed from the rear face of substrate 1 using a rear face irradiation light 12 and exposed from the surface using a surface irradiation light 11 through a photo mask substrate 10 having a light-blocking layer 9. This forms an exposed area 8a of photosensitive resin 8 (FIGS. 1 and 2B). The exposure using the rear face irradiation light 12 is a self-aligned exposure using the gate electrode 2, source electrode wiring 5, and drain electrode 6 as masks. The surface irradiation light 11 exposes the contact hole 22a on the drain electrode 6 and also uses a photo mask substrate 10 having an opening 10a extended near to an edge of gate electrode 2 and source electrode wiring 5, as shown in FIGS. 1 and 3A. This step preferably has an exposure alignment accuracy allowance of D, for example 2 $\mu$m, as shown in FIGS. 1 and 3A.

Next, the pattern of the exposed region 8a of the photosensitive resin 8 is formed by a developing step (FIG. 2C). More specifically, unexposed portions of the photosensitive resin 8 are removed by developing the photosensitive resin, and the remaining photosensitive resin exposed from one or both faces becomes an etching mask. The exposed region 8a formed as above is used as an etching mask for etching transparent conductive film 7 to form a pixel electrode 7a. Lastly, exposed region 8a of photosensitive resin 8 is removed to obtain an active element array substrate (FIGS. 2D and 3B).

Protective film 22 electrically insulates pixel electrode 7a from gate electrode 2 and source electrode wiring 5, making this method effective for manufacturing array substrates with a large aperture ratio at good yields. In the preferred embodiment, SiNx, an inorganic material, is used for the protective film 22, but an organic material may also be used. In this case, a lower dielectric constant and a thicker film more securely enable pixel electrode 7a to separate from the gate electrode and source electrode wiring, reducing crosstalk.

Exposure to surface irradiation light in the prior art uses the photo mask substrate with the pattern of the light-blocking layer 9 which has an opening only to the drain electrode 6, as shown in FIG. 4. In other words, the prior art results in a somewhat smaller exposure region from the surface, and a broader light-blocked region. This increases the possibility of the presence of scratches and adherence of dust on the rear face of the substrate corresponding to the light-blocked region of the photo mask substrate. A portion of photosensitive resin 8 that remains unexposed because of such scratches or dust is thus removed by developing. The present invention, on the other hand, exposes almost the entire region destined to become the pixel electrode. An edge area of the gate electrode wiring and source electrode wiring is provided, however, as a region that is protected from surface exposure at a width (D, as shown in FIGS. 1 and 3A) equivalent to the alignment accuracy. This prevents the generation of parasitic capacity by an overlap of each gate electrode 2 and source electrode wiring 5 with a pixel electrode 7a due to deviations in alignment during each manufacturing process.

The preferred embodiment enables the exposure of any photosensitive resin 8 remaining on the substrate, such as due to insufficient exposure from the rear face caused by scratches or dust on the rear face of the substrate, by using a photo mask having a broad opening 10a for exposure from the surface. This prevents the occurrence of defects in the pixel electrode 7a by removing resist on areas where scratches or dust were present on the rear face of the substrate during developing.

In the above description, the gate electrode 2 is made of AlZr alloy, and the source electrode wiring 5 and drain electrode 6 are made of Ti. Provided that gate electrode 2, source electrode wiring 5, and drain electrode 6 block the rear face irradiation light and can function as an electrode of a TFT array and wiring respectively, however, metals with a high melting point, such as Cr and Ta, or multi-layer structures such as Ti/Al/Ti, may be used. The sequence of exposure by the rear face irradiation light 12 and surface irradiation light 11 may be determined as required. A non-linear 2-terminal element, such as MIM (metal-insulator-metal), may be used as an active element instead of TFT.

The present invention enables the complete exposure of photosensitive resin on the drain electrode to which the pixel electrode is connected and on the pixel electrode region extending to near the wiring, even if scratches or dust are present on the rear face of the substrate during exposure of photosensitive resin 8. This is accomplished by selective exposure from the surface in addition to exposure from the rear face using a rear face irradiation light 12. This prevents dust or scratch shadows from having any detrimental effect on the pixel electrode 7a. Accordingly, the present invention provides an advantageous process for manufacturing an active element array substrate with a large aperture ratio at good yields.

Reference numerals 1 substrate
2 gate electrode
3 gate insulation film
4 a-Si island
5 source electrode wiring
6 drain electrode
7 transparent conductive layer
7a pixel electrode
7b defect
8 photosensitive resin
9 light-blocking layer
10 photo mask substrate
11 surface irradiation light
12 rear face irradiation lights
13 dust
20 channel layer
21 contact layer
22 protective film
22a contact hole

What is claimed is:

1. A process for manufacturing an active element array substrate, the active element array substrate comprising one or more pixel electrodes for driving liquid crystal and one or more active elements each connected to one of said pixel electrodes via a connecting electrode, said one or more pixel electrodes and said one or more active elements aligned in a matrix on a transparent substrate, the transparent substrate having a front surface and a rear face, said process comprising the steps of:

(a) forming said one or more active elements and one or more wirings connected to said active elements on the front surface of the transparent substrate;
   (b) forming a transparent conductive layer entirely covering said front surface of said transparent substrate;
   (c) forming a negative photosensitive resin layer entirely covering said transparent conductive layer;
   (d) exposing said photosensitive resin layer to a light from said rear face of said transparent substrate using said one or more wirings and said one or more connecting electrodes as a self-aligned mask;
   (e) selectively exposing a portion of said photosensitive resin layer to a light directed at said front surface of said transparent substrate, said portion comprising substantially all of said one or more pixel electrodes, including a portion over each connecting electrodes;
   (f) developing said exposed photosensitive resin layer to form a mask; and
   (g) forming said one or more pixel electrodes by processing said transparent conductive layer using said mask.

2. The process of claim 1 further comprising between step (a) and step (b), the steps of:

(a1) forming an insulation film entirely covering said front surface of said transparent substrate over said one or more active elements and said one or more wirings; and
   (a2) forming one or more contact holes on said insulation film, each contact hole aligned with a portion of one of said connecting electrodes.

3. The process of claim 2 further comprising leaving a predetermined width of said photosensitive resin layer adjacent said wiring unexposed in step (e), said predetermined width equivalent to an alignment accuracy allowance.

4. The process of claim 3 wherein said one or more active elements comprise thin film transistors and said one or more connecting electrodes comprise drain electrodes.

5. The process of claim 3 wherein said transparent conductive layer comprises indium tin oxide.

6. The process of claim 2 wherein said one or more active elements comprise thin film transistors and said one or more connecting electrodes comprise drain electrodes.

7. The process of claim 2 wherein said transparent conductive layer comprises indium tin oxide.

8. The process of claim 2 wherein said insulation film comprises an inorganic material.

9. The process of claim 2 wherein said insulation film comprises an organic material.

10. The process of claim 1 further comprising leaving a predetermined width of said photosensitive resin layer unexposed adjacent said wiring in step (e), said predetermined width equivalent to an alignment accuracy allowance.

11. The process of claim 10 wherein said one or more active elements comprise thin film transistors and said one or more connecting electrodes comprise drain electrodes.

12. The process of claim 3 wherein said transparent conductive layer comprises indium tin oxide.

13. The process of claim 1 wherein said one or more active elements comprise thin film transistors and said one or more connecting electrodes comprise drain electrodes.

14. The process of claim 1 wherein said transparent conductive layer comprises indium tin oxide.

15. A process for forming a pixel electrode for a liquid crystal element on a substrate, the liquid crystal element also comprising an active element and wiring associated therewith, the process comprising the steps of:

(a) forming a continuous transparent electrode layer over said substrate, said active element, and said associated wiring;

(b) forming a continuous photosensitive layer over said transparent electrode layer, said photosensitive layer having a back side and an opposite front side; and (c) exposing said photosensitive layer to radiation from said back side and from said front side, including exposing from said front side substantially all of said photosensitive layer designated to become said pixel electrode that is not masked during the exposure from the back side by the active element and associated wiring.

\* \* \* \* \*